(12) United States Patent
Karkanias et al.

(10) Patent No.: US 8,285,259 B2
(45) Date of Patent: *Oct. 9, 2012

(54) RESOURCE AGGREGATION IN AN OPPORTUNISTIC NETWORK

(75) Inventors: Chris Demetrios Karkanias, Sammamish, WA (US); Stephen Edward Hodges, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 824 days.

This patent is subject to a terminal disclaimer.

(21) Appl. No.: 11/754,528

(22) Filed: May 29, 2007

(65) Prior Publication Data

US 2008/0299951 A1    Dec. 4, 2008

(51) Int. Cl.
*H04M 3/42* (2006.01)
(52) U.S. Cl. .............. 455/414.1; 455/41.3; 455/452.1; 455/452.2; 455/456.3; 455/557; 370/238; 370/338
(58) Field of Classification Search .......... 370/238, 370/260; 455/414.1, 502
See application file for complete search history.

(56) References Cited

U.S. PATENT DOCUMENTS

| | | | |
|---|---|---|---|
| 6,199,099 B1 | 3/2001 | Gershman et al. | |
| 6,282,577 B1 | 8/2001 | Okanoue et al. | |
| 6,421,232 B2 | 7/2002 | Sallam | |
| 6,516,316 B1 | 2/2003 | Ramasubramani et al. | |
| 6,816,882 B1 | 11/2004 | Conner et al. | |
| 6,822,639 B1 | 11/2004 | Silverbrook et al. | |
| 6,850,502 B1 | 2/2005 | Kagan et al. | |
| 6,965,568 B1 * | 11/2005 | Larsen | 370/238 |
| 6,980,537 B1 | 12/2005 | Liu | |
| 6,988,056 B2 * | 1/2006 | Cook | 702/189 |
| 7,072,650 B2 | 7/2006 | Stanforth | |
| 7,099,297 B2 | 8/2006 | Hughes et al. | |
| 2002/0032751 A1 | 3/2002 | Bharadwaj | |
| 2002/0087674 A1 * | 7/2002 | Guilford et al. | 709/223 |
| 2002/0104011 A1 | 8/2002 | Svoboda | |
| 2003/0065715 A1 | 4/2003 | Burdick et al. | |
| 2003/0179742 A1 | 9/2003 | Ogier et al. | |
| 2004/0097260 A1 | 5/2004 | Stenton et al. | |
| 2005/0037787 A1 * | 2/2005 | Bachner et al. | 455/502 |
| 2005/0102377 A1 | 5/2005 | King et al. | |

(Continued)

FOREIGN PATENT DOCUMENTS

KR    10-2001-0013499    2/2001

(Continued)

OTHER PUBLICATIONS

Erik Sundelof. Are Cellphones the Thin Client of the World Wide Web or a Part of the World Wide Web? pp. 1-6. http://inthefieldonline.net/inthefieldonline_w3c_bangalore_dec2006.pdf. Last accessed Nov. 20, 2006.

(Continued)

*Primary Examiner* — Anthony Addy
*Assistant Examiner* — Shahriar Behnamian
(74) *Attorney, Agent, or Firm* — Hope Baldauff Hartman, LLC

(57) ABSTRACT

A wireless opportunistic network that can facilitate resource aggregation by way of interconnected devices is disclosed. In accordance with this opportunistic network, a mobile device can effectively 'dock' into the network thereby enabling resources to be shared between devices within the network. In this manner, the docked mobile device can leverage resources available in each of the individual devices of the network. This functionality can be used in many scenarios related to health, from monitoring patients and analyzing basic diagnostic data to identifying bioterrorism by way of collaborating resources between devices within the network.

19 Claims, 12 Drawing Sheets

U.S. PATENT DOCUMENTS

| | | | |
|---|---|---|---|
| 2005/0117527 A1* | 6/2005 | Williams et al. | 370/260 |
| 2005/0153725 A1 | 7/2005 | Naghian et al. | |
| 2005/0181734 A1 | 8/2005 | Coutts et al. | |
| 2005/0185606 A1 | 8/2005 | Rayment et al. | |
| 2006/0166740 A1 | 7/2006 | Sufuentes | |
| 2006/0198448 A1* | 9/2006 | Aissi et al. | 375/259 |
| 2007/0050522 A1* | 3/2007 | Grove et al. | 709/246 |
| 2007/0133665 A1* | 6/2007 | Litwin | 375/219 |
| 2007/0197881 A1* | 8/2007 | Wolf et al. | 600/300 |

FOREIGN PATENT DOCUMENTS

| | | |
|---|---|---|
| WO | WO 98/56140 | 10/1998 |
| WO | WO 00/25485 | 5/2000 |
| WO | WO 2004/088874 | 10/2004 |

OTHER PUBLICATIONS

Frank Stajano, et al. The Thinnes of Clients: Controlling It All Via Cellphone. pp. 1-8. http://www.cl.cam.ac.uk/~fms27/papers/tr.98.3.pdf. Last accessed Nov. 20, 2006.

Sean Landis, et al. Reaching out to the Cell Phone with Jini. http://ieeexplore.ieee.org/iel5/7798/21442/00994515.pdf?isNumber=. Last accessed Nov. 20, 2006.

U.S. Official Action dated Jan. 27, 2010 in U.S. Appl. No. 11/680,073.

U.S. Official Action dated Jul. 26, 2010 in U.S. Appl. No. 11/680,073.

U.S. Official Action dated Dec. 9, 2010 in U.S. Appl. No. 11/680,073.

U.S. Notice of Allowance dated May 27, 2011 in U.S. Appl. No. 11/680,073.

International Search Report dated Jun. 25, 2008 in International Application No. PCT/US08/053546.

Ronai et al, "A simple neighbor discovery procedure for Bluetooth ad hoc networks," accessed Nov. 30, 2006 from http://www.ronai.hu/doc/GlobeCom2003-NDP_for_Bt.pdf, 5 pages.

Chlamtac et al., "Mobile ad hoc networking: Imperatives and challenges," 2003, *Ad Hoc Networks*, pp. 13-64.

Bruno et al., "Mesh networks: Commodity multihop ad hoc Networks," Mar. 2005, *IEEE Communications Magazine*, pp. 123-131.

U.S. Official Action dated Dec. 23, 2012 in U.S. Appl. No. 13/224,171.

U.S. Notice of Allowance dated May 1, 2012 in U.S. Appl. No. 13/224,171.

* cited by examiner

RESOURCE AGGREGATION IN AN OPPORTUNISTIC NETWORK

BACKGROUND

With the ever-increasing popularity of personal mobile devices, e.g., cell phones, smartphones, personal digital assistants (PDAs), personal music players, laptops, etc., 'mobility' has been the focus of many consumer products as well as services of wireless providers. For example, in the telecommunications industry, 'mobility' is at the forefront as consumers are no longer restricted by location with regard to communications and computing needs. Rather, today, as technology advances, more and more consumers use portable devices in day-to-day activities, planning and entertainment.

As mobile device popularity increases, the ability to make telephone calls, access electronic mail, communicate via instant message (IM) and access online services from any location has also continued to evolve. Although wireless technology for data transmission has been available for quite some time, limitations such as bandwidth and area coverage plague service providers. More particularly, these types of limitations have prevented providers from seamlessly establishing mass deployments of wireless networks.

More recent innovations such as the WiFi standards and other expanded wireless technologies have made it possible to deploy location-based (e.g., city-wide) wireless access networks and thereafter, to offer revenue-generating mobile wireless access services. However, most often, these wireless access networks do not extend to less populated areas due to driving economic concerns. Rather, these conventional networks target areas with a high population density and do not address those potential consumers in less populated areas. This lack of expansion is most often due to the wired characteristics of the wireless repeater nodes, as well as costs associated therewith. For example, most often, rural areas are not covered by the service area of a conventional cell tower or mesh network thereby leaving a gap in the coverage area.

An 'opportunistic' network can refer to the use of a co-operating set of mobile or stationary devices to transfer data whenever connection opportunities arrive. These opportunities may be limited by the effects of mobility, computational limitations, bandwidth limitations, and other factors. Both wired and wireless links can be used as connection opportunities. Opportunistic networks have the advantage of being able to employ 'store and forward' data transfer where data is not sent from one end of the network to the other immediately, but is instead passed hop-by-hop and stored on intermediate nodes until that node has a suitable connection opportunity to pass it on in turn. This allows opportunistic networks to cope with large variations in network topology and with poor link qualities, in addition to traditional networking situations (e.g., where Internet access is available).

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises an opportunistic network that can facilitate resource aggregation between a group of network-connected devices where each device effectively makes its resources available to other devices within the network. In other words, the innovation describes an opportunistic network of devices where a device can essentially 'dock' to the network which enables access and use of resource (e.g., processing power, storage capacity, applications)) of other devices within the network.

This innovation discloses a 'docking' station or framework that accesses the computing (and other resources (e.g., printing, image capture, display) capability of network-connected devices and makes them available via a cell phone or other mobile device. Because the computational capacity continues to increase in handheld devices, the innovation enables a cell phone (or other portable device) to be used as a personal desktop to access remote applications and/or services (e.g., resources) available within the network. There can be applications and services that a cell phone or other mobile devices cannot process locally, however, given the ubiquitous connectivity framework of emerging networks, the mobile device can be used as a terminal services client to a much higher capacity central processing unit. In aspects, a cell phone can be employed as a thin client in a 'cloud' or 'off premise' infrastructure such that, the cell phone can be 'docked' (wired or wirelessly) into a generic terminal thereafter displaying and providing access to a user-specific desktop.

In one aspect, the cell phone can be used to capture and transfer data to a remote server or cloud based network. As cell phones increase in capabilities, it can be possible to connect a keyboard and/or mouse to it to make it sufficient for many services when 'docked'. Effectively, upon 'docking' the cell phone, it can become a personal desktop in that can access remote data and/or process data locally. In operation, it will be understood that it will be possible to install a light version of an operating system for cell phone use and a heavier, more robust version for 'docking' uses.

In yet another aspect thereof, a machine learning and reasoning (MLR) component is provided that employs a probabilistic and/or statistical-based analysis to prognose or infer an action that a user desires to be automatically performed. By way of example, MLR mechanisms can be employed to make inferences that facilitate accurate and timely 'docking' decisions related to a network of devices. In a specific example, an MLR component, based upon type of activity, time of day and other contextual factors, can determine which devices to select as resource aggregation devices within the opportunistic network in order to enhance the computing experience.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
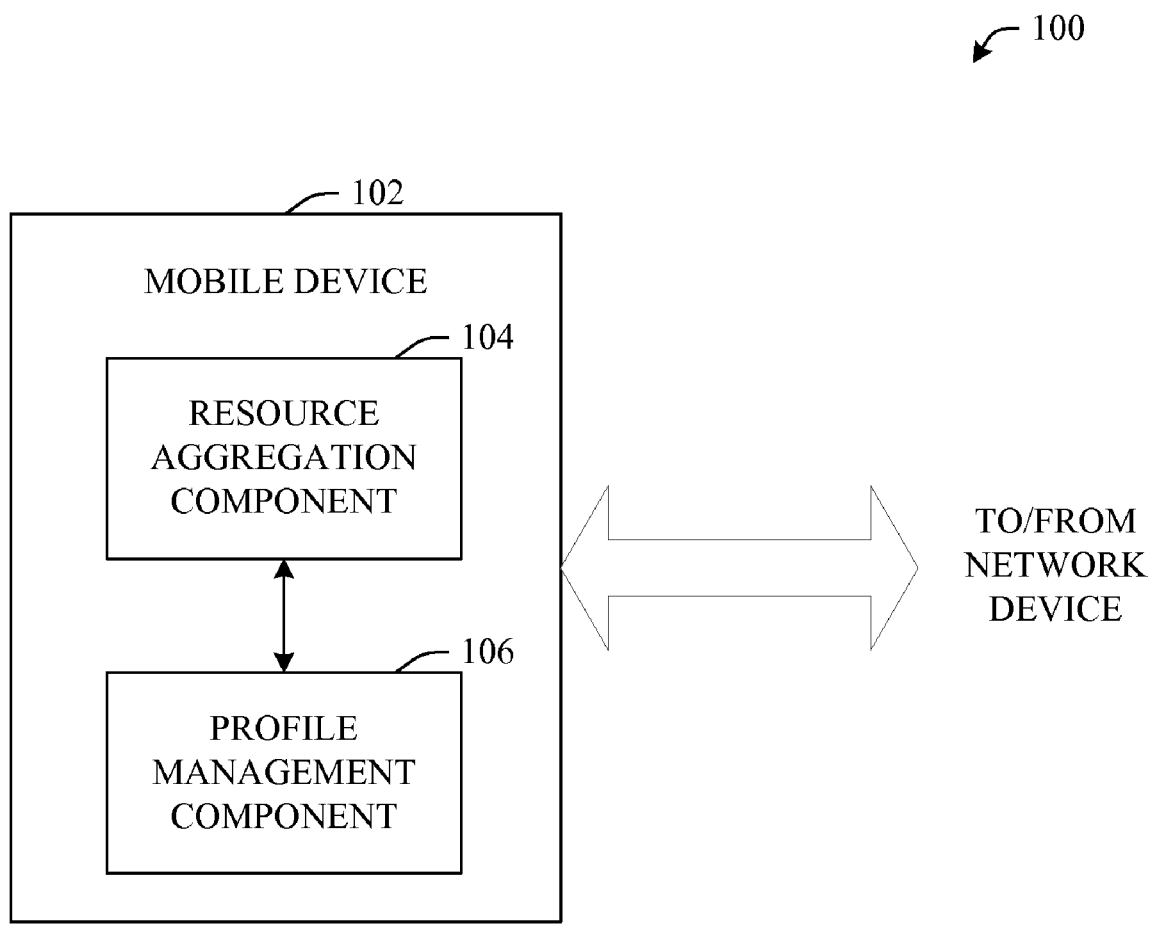
FIG. 1 illustrates a mobile device that facilitates aggregation of resources within an opportunistic network in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates aggregation, pooling and/or sharing of resources in an opportunistic network in accordance with an aspect of the innovation. Generally, system 100 illustrates a mobile device 102 having a resource aggregation component 104 and a profile management component 106 therein. These components (104, 106) enable resources to be shared within an opportunistic network. In other words, these components effectively enable the mobile device to 'dock' to other devices within the opportunistic network. While many of the embodiments described are directed to opportunistic networks, it is to be understood that the features, functionality and benefits described herein are applicable to other suitable wireless and/or wired network environments known in the art.

In operation, the resource aggregation component 104 enables the mobile device to pool resources from other devices within the network. By way of example, resources can include, but are not limited to include, processing power, storage space, image capture capability, audio capture/transfer capability, or the like. As described in greater detail infra, the innovation enables resources to be pooled or shared between devices which include, but are not limited to, smartphones, cell phones, personal digital assistants (PDAs), laptop computers, desktop computers, printers, storage devices, scanners/image capture devices, cameras, voice-over-internet protocol (VoIP) phones or the like.

The resource aggregation component 104 can automatically detect opportunities to access resources. Thereafter, connection can be automatically made in order to pool, access or share the resources between most any subset of available devices. It is to be understood that the resource aggregation component 104 can dynamically maintain an index of available devices. For instance, as the context changes with respect to mobile device 102, the available devices too will change. By way of example and not limitation, the context can refer to location, activity of user, date, time of day, direction of travel, target destination, or combination thereof.

The profile management component 106 maintains logic (e.g., rules) by which the resource aggregation component 104 can employ to determine which devices to connect to as well as which resources to pool between the devices. For example, suppose a user employs mobile device 102 to answer a VoIP call which includes a video stream in addition to the audio stream. Here, a rule can be established and stored within the profile management component 106 that defines which device(s) to employ in connection with the call in accordance with a current context. For example, suppose the user is in their home office when the call is received. Here, the audio portion of the call can be sent to a cell phone while a desktop computer can employed to automatically aggregate the video playback functionality of the desktop to render the video portion of the call.

Figure 2:
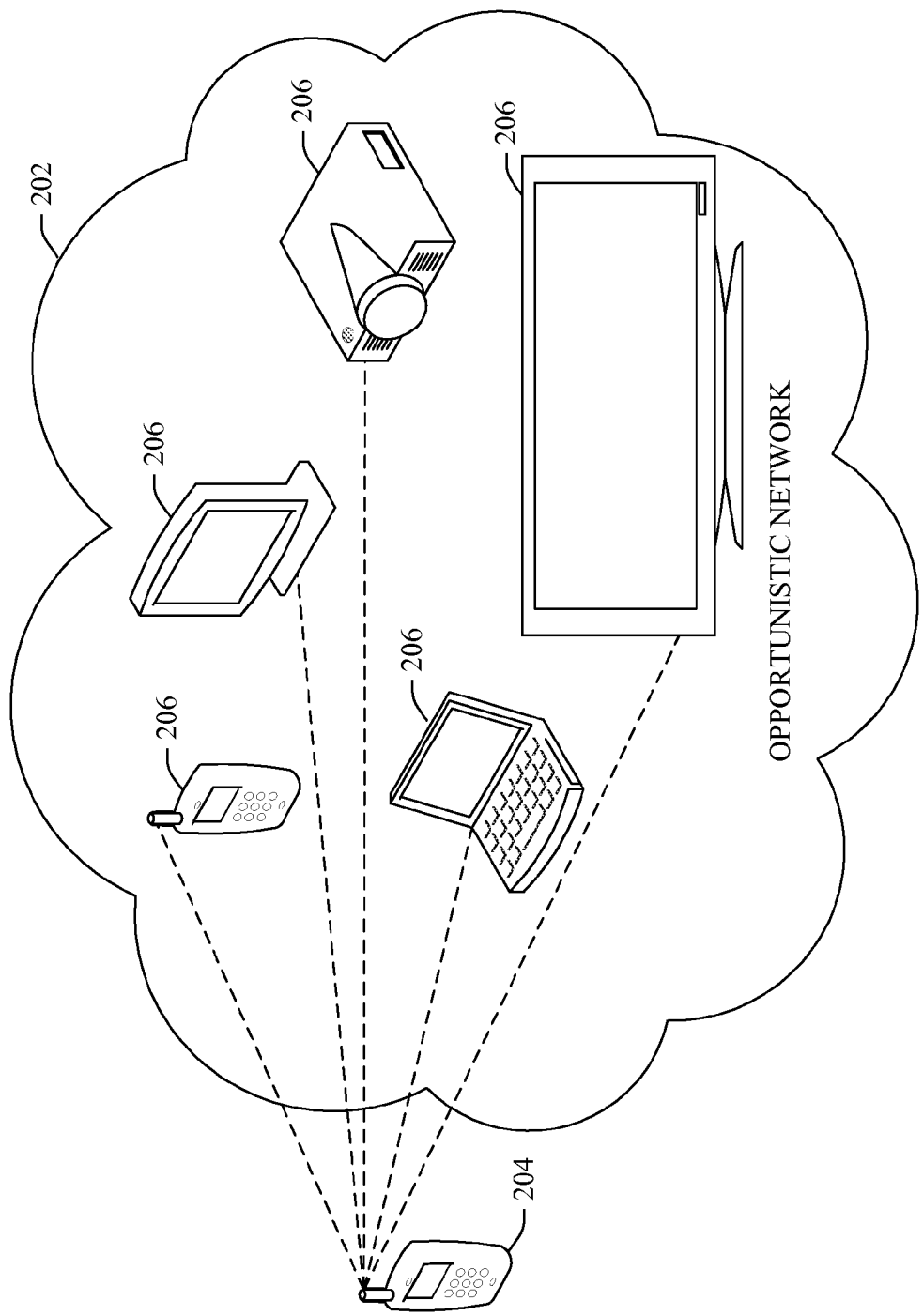
FIG. 2 illustrates an example wireless opportunistic network in accordance with an aspect of the innovation.

Referring now to FIG. 2, there is illustrated a system 200 that facilitates the aggregation of resources by way of an opportunistic network. As shown, an opportunistic network 202 can be employed to pool resources and transfer data between an origin device 204 and a variety of support devices 206. Because mobile devices (e.g., cell phones) are ubiquitous in many markets today, it can be possible to establish a peering network or opportunistic network 202 such that each device can participate in information transfer, process and render throughout the network 202. As depicted by dashed lines throughout the network 202, information can be sent to/from most any suitable device including but, not limited to smartphones, monitors, laptop computers, desktop computers, projectors, etc. These paths illustrate sophisticated collaboration between the devices with respect to data processing, display, output, rendering, storage, access, etc.

In summary, the subject innovation relates to an opportunistic network 202 that can be established between network-connected mobile devices (e.g., 206), for example, cellular telephones, PDAs, smartphones, peripherals or the like. Rather than processing all data within the smartphone, the innovation shifts to an 'erratic' or dynamic topology 202 where each device can process a portion of the data. In other words, the network 202 enables the mobile devices (204, 206) to aggregate resources as needed, desired, inferred or directed. In one example, it is possible to use the opportunistic network 202 as an intranet where resources can be aggregated between devices within the network 202.

It will be appreciated that one feature/benefit of the opportunistic network 202 is that devices that do not contain specific resources can access resources from other devices within the opportunistic network thereby enhancing functionality of devices within the network. The network 202, essentially interconnects each of the devices maintained within the network 202 thereby increasing functionality of each of the devices within the network 202. It is to be understood that the aggregation functionality described herein can be applied to most any industry. In a specific example, the features, functions and benefits of the innovation can be applied to health-related scenarios.

In the health-related scenarios, the aggregation of resources can be valuable in many different instances. By way of example, and not limitation, the innovation can be used in a detection and/or response to an unfortunate instance of bioterrorism. In these scenarios, the devices can share resources in an effort to capture, analyze and address issues of bioterrorism. More particularly, the innovation can be used to capture environmental readings via sensory mechanisms maintained within a variety of devices within the network 202. Similarly, the readings can be processed and/or rendered using other devices within the network. It is to be appreciated that this is but one example of the aggregation of resources within the network 202. Other examples exist and are to be included within the scope of this specification and claims appended hereto.

In another particular aspect, the opportunistic network 202 can execute applications with particular networking needs in a health-care context. For example, a first device such as an event recorder component can be used to capture images of events associated with a monitored entity (e.g., patient, elderly person). The images can be initially stored on the first device and transferred to a subsequent device for processing when an opportunistic connection is able to be established. In other words, when the location of the origin device in relation to the opportunistic network 202, or in relation to at least one device of the opportunistic network, permits connectivity, the images can be automatically transferred for further processing, analysis, display, etc. As will be understood, this transfer can occur instantaneously (e.g., real-time) or in accordance with a defined or inferred profile.

Figure 3:
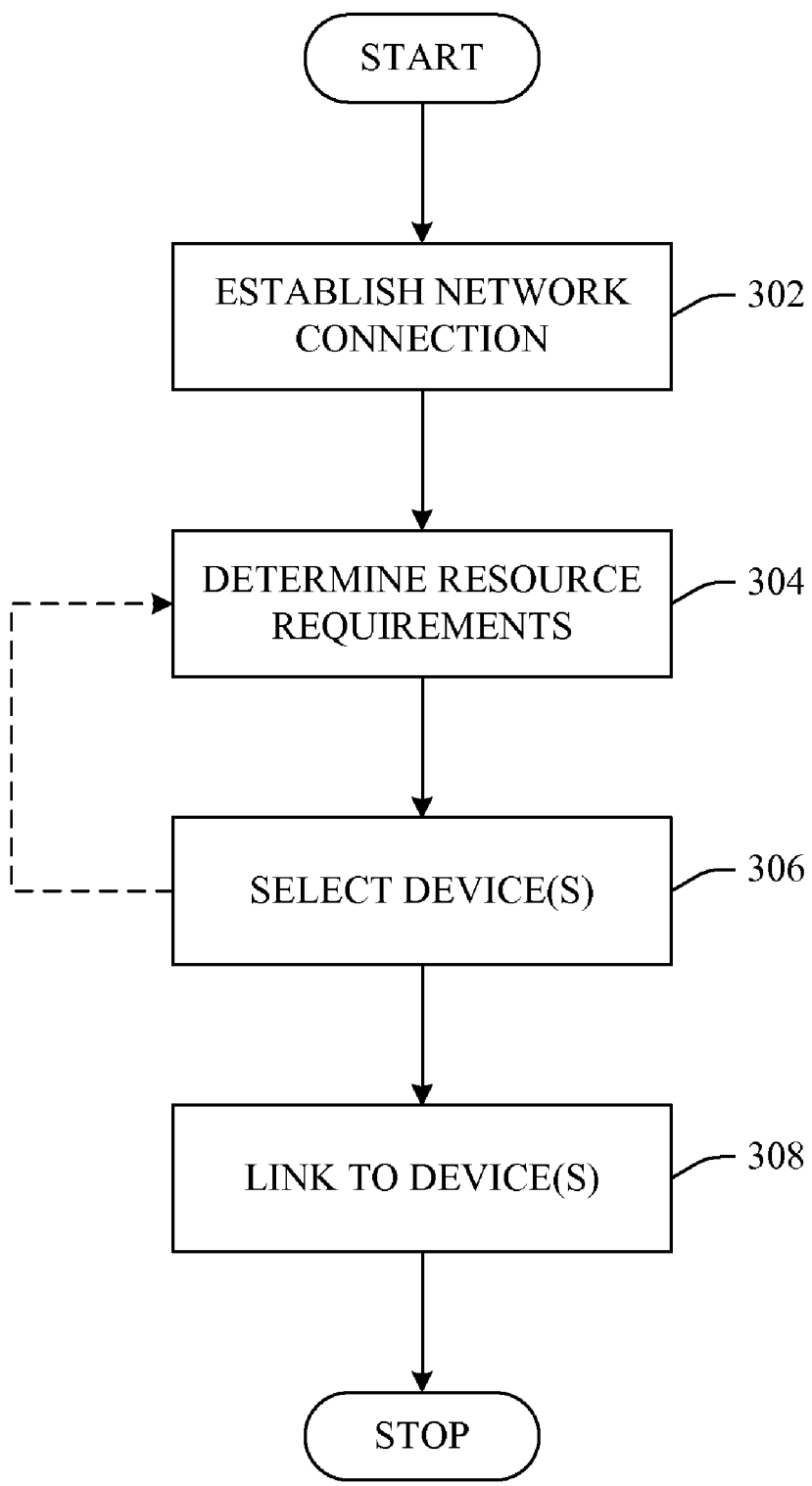
FIG. 3 illustrates an example flow chart of procedures that facilitate transfer linking devices in accordance with an aspect of the innovation.

FIG. 3 illustrates a methodology of linking devices within an opportunistic network in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 302, an opportunistic network connection can be established, for example, a peer-to-peer (P2P) connection can be established directly between mobile devices (e.g., cell phones) and/or other static devices. In other aspects, 'hybrid' connections can be established, for example, a connection to a opportunistic network can be established by devices that employ P2P wireless as well as wired technologies. It is to be understood that the innovation described herein includes most any connection framework or infrastructure completely or partially embodied within a distributed mobile device network. As such, although many examples described herein are directed to a P2P protocol, other examples exist and are to be included within the scope of this disclosure and claims appended hereto.

At 304, resource requirements can be established, for example, a determination can be made if a specific peripheral is desired in accordance with a predefined or inferred rule. In other words, a determination can be made with respect to what type of resource(s) are desired to address a particular scenario, assist in a particular activity, conform to a context, etc. In accordance therewith, a device or group of devices are selected at 306.

As described above, the devices selected can be selected for processing power, storage, functionality, etc. Once selected, devices can be linked at 308. Thus, resources can be aggregated between the devices. Essentially, a mobile device such as a smartphone can be 'docked' into the network thereby enabling aggregation of resources (e.g., processing power, storage space, image capture functionality) between devices within the network.

The dashed line between 306 and 304 denotes the possible recursive nature of these acts within the methodology. In other words, it is to be understood that, because an opportunistic network is inherently dynamic, resource requirements can change as well as devices available to provide resources. Hence, these acts can be recursive in accordance with the ever-changing parameters of the opportunistic network.

Figure 4:
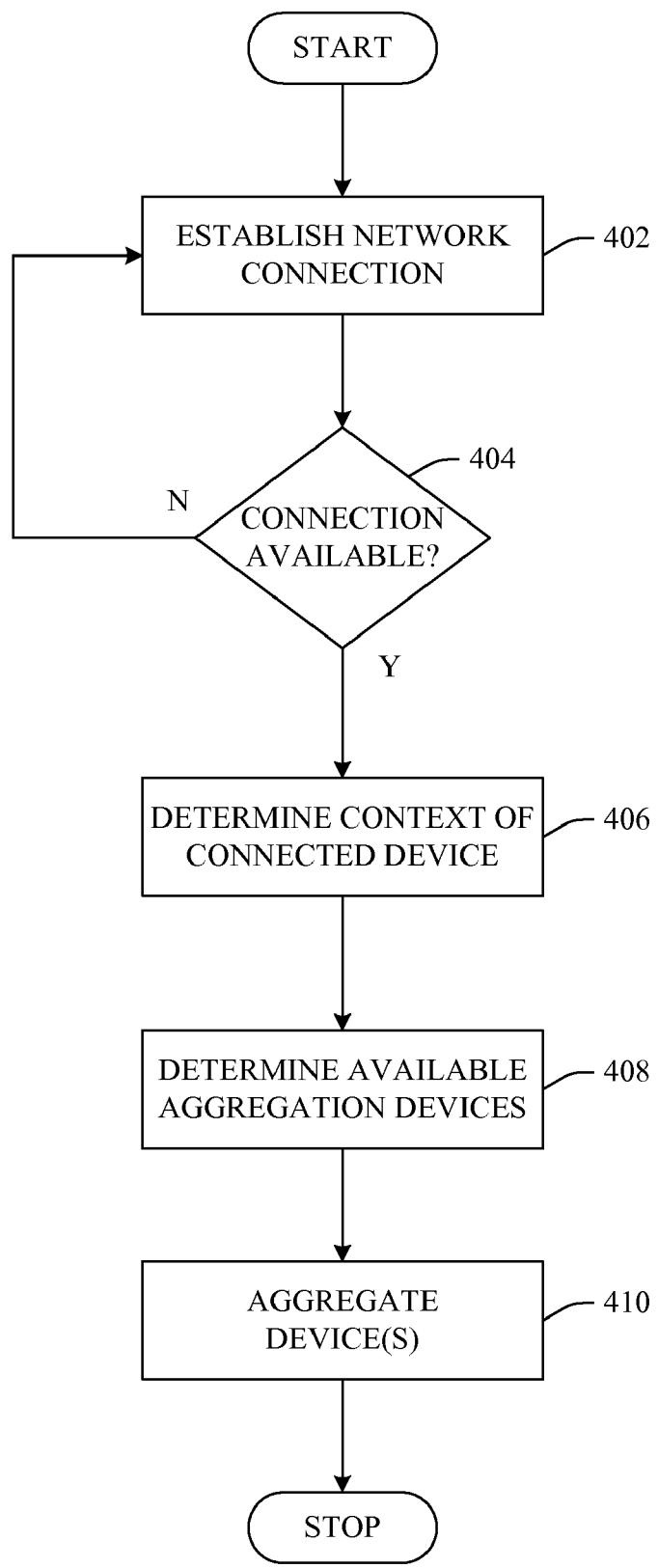
FIG. 4 illustrates an example flow chart of procedures that facilitate contextual awareness with respect to device aggregation in an opportunistic network in accordance with an aspect of the innovation.

Referring now to FIG. 4, there is illustrated a methodology of establishing a network connection and selecting appropriate devices in accordance with an aspect of the innovation. Essentially, this methodology illustrates the ability to employ sophisticated intelligence or logic as well as inference mechanisms to establish a connection within the opportunistic network by which resources can be aggregated or shared. Accordingly, different devices can be selected for a routine voice call as would be for a priority health-related scenario detection and analysis (e.g., bioterrorism).

At 402, a network connection can be established between a mobile device and an opportunistic network. A determination is made at 404 to establish if a connection is available. If not, the methodology returns to 402 to establish the connection. As described above, this connection can be wireless or wired, or combination thereof. As well, the network can be most any other network without departing from the spirit and scope of the innovation. In other words, the features, functions and benefits of aggregating, pooling, sharing, etc. resources between a mobile device (e.g., smartphone) and other devices in a network (e.g., smartphones, laptops, peripherals, desktop computers, etc.) can be established in accordance with most any network or communication protocol.

Once a connection is established, at 406, the context of the device is established. For example, sensory mechanisms can be employed to establish a particular context of the device. In a particular example, location (e.g., global positioning system) and motion (e.g., accelerometer) mechanisms can be used to determine where a device is located and if it is in motion to a target location. For instance, these sensory mechanisms can assist to determine that a user is either in a conference room, or alternatively, on their way to the conference room. Here, this information can be used to determine available devices at 408.

At 408, available devices by which aggregation can be effected are identified. Essentially, contextual factors can be employed to identify the appropriate devices. Continuing with the example above, suppose the user is in a conference room having a number of network-connected devices (e.g., VoIP phone, cameras, projectors, monitors). Contextual factors such as, who is in the room, time of day, entries in the user's calendar (e.g., board meeting), engaged activity, etc. can be used to determine the appropriate devices to connect. Thus, the user's mobile device can be employed essentially as a thin client to provide metadata (e.g., application preferences, desktop settings, formats) and other information (e.g., application license, digital rights management (DRM) license) whereas the aggregated devices can provide computational and other functional resources.

The devices can be aggregated at 410. In other words, the devices can be aggregated so as to effect pooling of the resources within the network. As described above, effectively, this methodology can be viewed as a comprehensive and intelligent methodology of 'docking' a cell phone or mobile device within a network. It will be understood and appreciated that this scenario will enable cell phones to maximize storage capacity and processing power by storing user-specific data while other network-connected devices can house monolithic applications which can be accessed through the 'docking' process.

Figure 5:
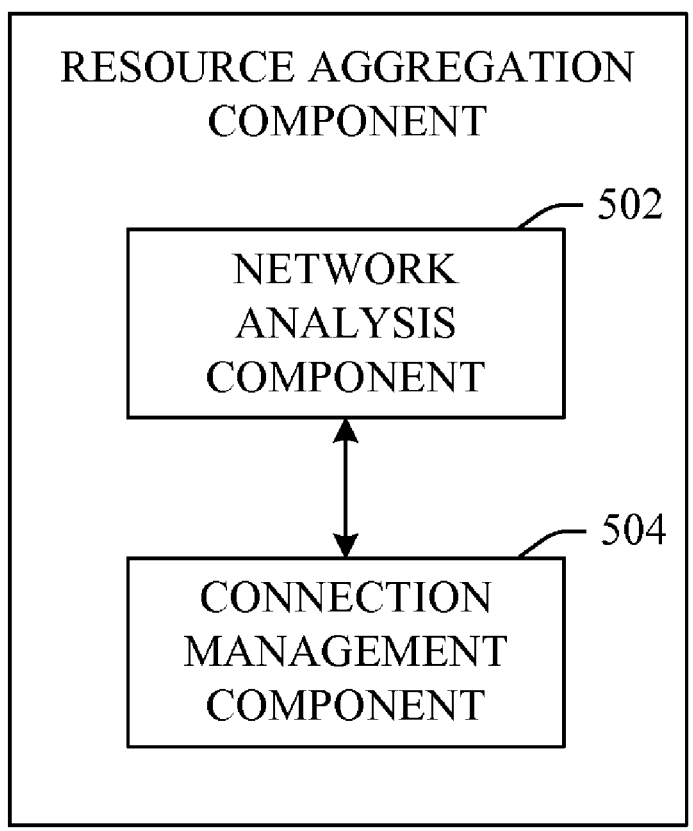
FIG. 5 illustrates an example resource aggregation component that identifies and facilitates connection in accordance with an aspect of the innovation.

Referring now to FIG. 5, an example block diagram of a resource aggregation component 104 (as described with reference to FIG. 1) is shown. Generally, the resource aggregation component 104 can include a network analysis component 502 and a connection management component 504, each of which will be described in greater detail infra. Together, these components (502, 504) enable a device to intelligently analyze available network resources and to thereafter select and appropriate devices in view of those resources available.

The network analysis component 502 can search for an available network or device(s) available for connection. As well, the network analysis component 502 can analyze and/or evaluate the details of available devices within a network in order to identify resources available with respect to each device. For example, as mentioned above, the network analysis component 502 can search for an available network and subsequently evaluate availability and criteria of devices within the identified network.

In aspects, the evaluation can be based upon a predefined rule or inference as appropriate. In other words, the evaluation and identification of devices can be based upon expense, availability, urgency (e.g., acuteness/severity of a health-related scenario), priority, access rights, etc. As will be understood, the examples are countless thus; this specification is intended to include all conceivable aspects of aggregating resources between a mobile device and other network-connected devices.

The connection management component 504 can be employed to intelligently decide an appropriate device for which to connect. It is to be understood that the resource aggregation concepts described herein enable unique opportunities for service providers. For instance, a service provider can offer different rate packages in accordance with reserving a portion of a device's processing capability. In other words, if a user is willing to allow resources on a device to be used in an aggregation scenario, a service provider can incorporate this into the user's service plan, for example, by offering a lower rate if there is an agreement to share resources (e.g., processor, storage). It will be appreciated that these monetization schemes can be based upon most any criteria, for example, permit aggregation at a particular time of day, day of week, for a particular type of resource, from particular origins, etc.

Figure 6:
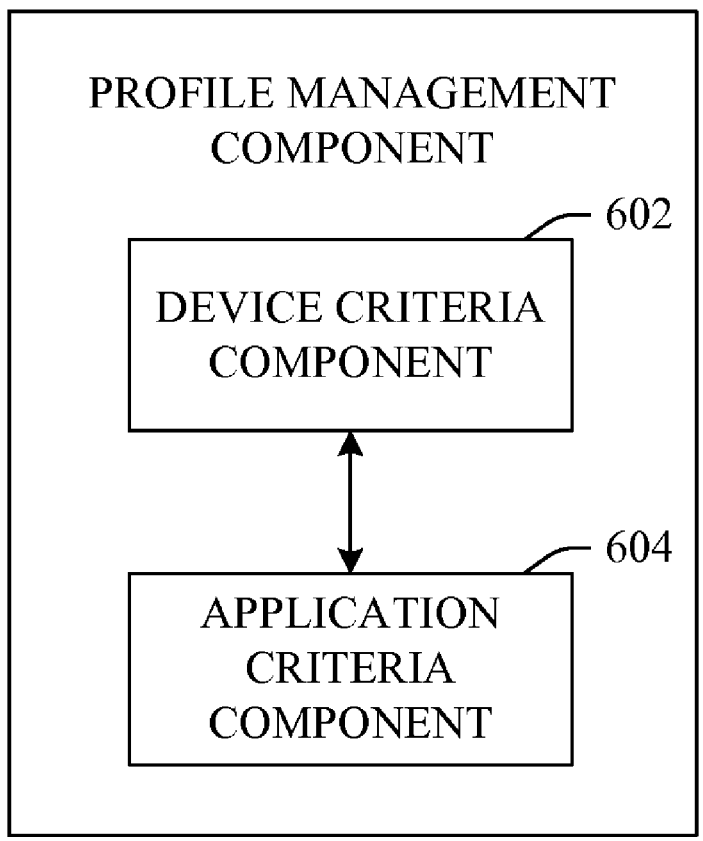
FIG. 6 illustrates an example profile management component that facilitates maintaining personal preference and selection criteria in accordance with an aspect of the innovation.

Referring now to FIG. 6, an example profile management component 106 is shown. In effect, the profile management component 106 can provide user-specific information that can be employed in connection with selection and use of aggregated devices. For example, device criteria component 602 can include rules and/or policy information which enable comprehensive and intelligent selection of devices and associated resources. The application criteria component 604 can maintain information related to specific application and data resources. For example, user preferences with regard to which applications to use in accordance with specific activities can be defined by the application criteria component 604. Similarly, license information can be maintained by this component (604) and provided to the appropriate aggregated device in order to authorize use of a particular application or service.

Moreover, application criteria component 604 can maintain other user-specific preferences including, but not limited to, desktop settings, application settings, printer settings, DRM licenses, location settings, etc. This information can be employed to personalize the resource aggregation experience. In other words, regardless of which device(s) or resource(s) used, the personal information (e.g., settings) can be employed to automatically configure the applicable settings, to provide license information, or to provide personal data files in order to tailor the device(s) or resource(s) to conform to a user's preference or desire.

Figure 7:
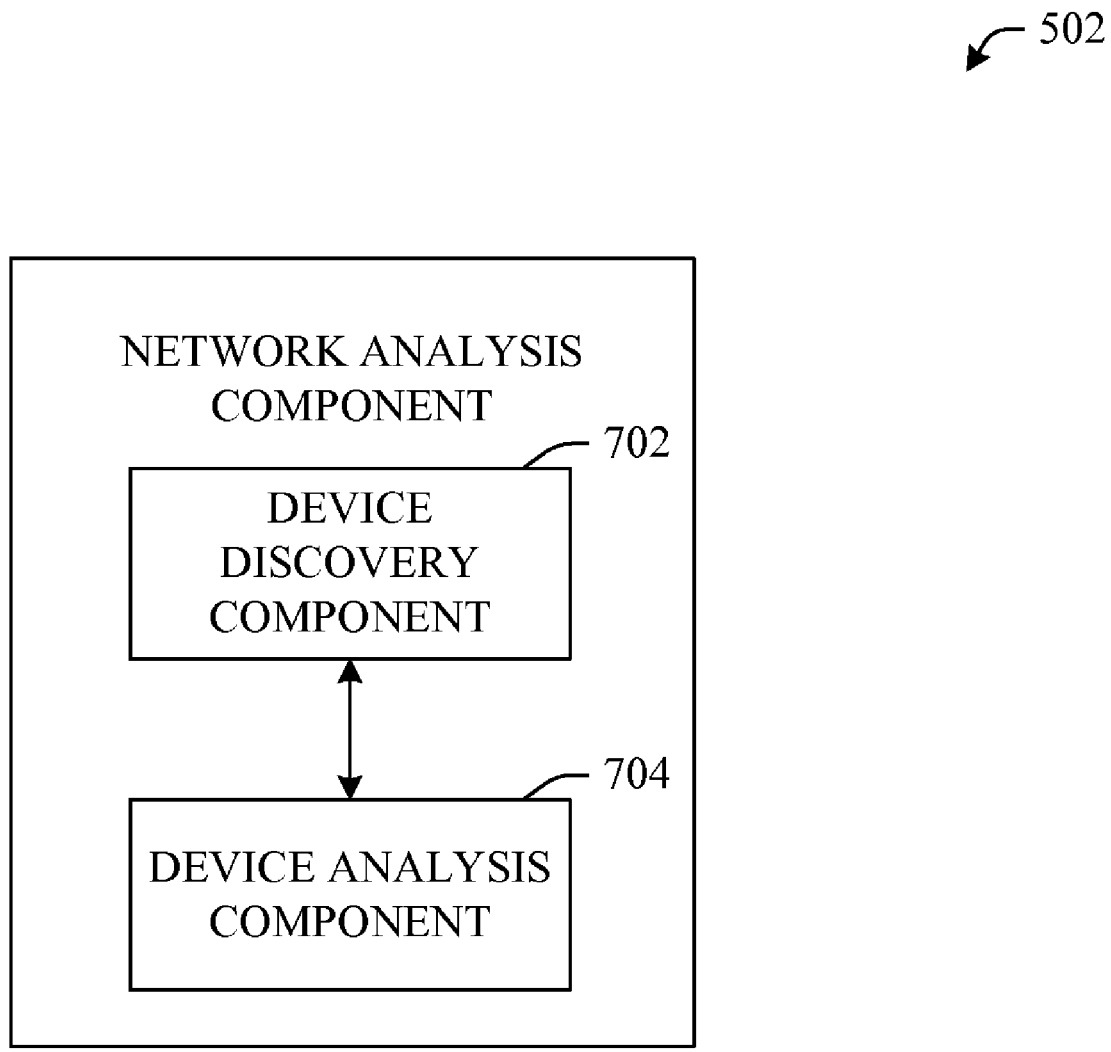
FIG. 7 illustrates an example network analysis component that facilitates discovery and analysis of devices in accordance with an aspect of the innovation.

Turning now to FIG. 7, a block diagram of an example network analysis component 502 is shown. Generally, the network analysis component 502 can include a device discovery component 702 and a device analysis component 704 that together facilitate identification of available network devices. As well, these components (702, 704) enable identification of characteristics of each device.

The device discovery component 702 can dynamically monitor devices connected to the network. For instance, the component 702 can dynamically monitor proximate devices connected to the opportunistic network. As it will be understood that the inventory of devices changes, the device discovery component 702 can monitor the network in real-time thereby actively identifying new devices as they come available. Alternatively, discovery can be user-initiated (e.g., manually triggered), schedule-initiated, or alternatively, triggered when a network resource is needed or desired.

The device analysis component 704 can be used to evaluate each device discovered within the network in order to establish resources available in each device. Accordingly, the innovation can employ the profile management component (106 of FIG. 1) to link to an appropriate device or group of devices as needed or desired as a function of the available resources.

Figure 8:
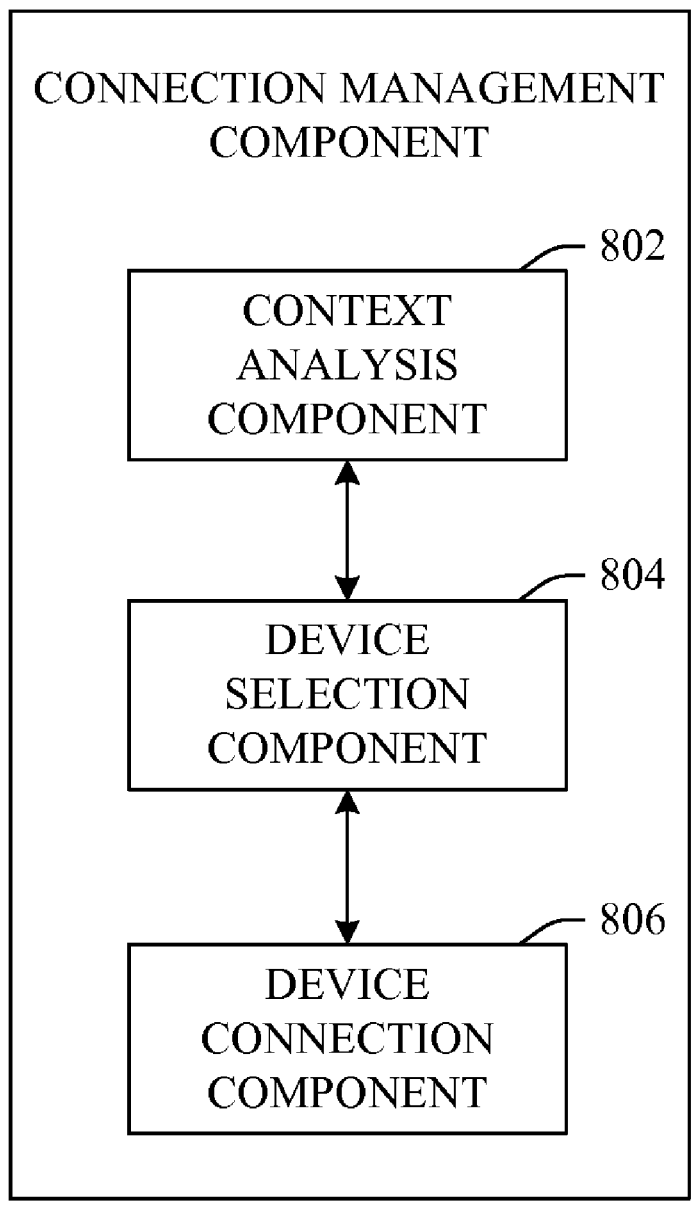
FIG. 8 illustrates an example connection management component that administers device connections in accordance with an aspect of the innovation.

Referring now to FIG. 8, an example connection management component 504 is shown. Generally, the connection management component 504 can include a context analysis component 802, a device selection component 804 and a device connection component 806. In an aspect, once a context is established, a device or group of devices can be selected that make resources available. Finally, connection can be established to each of the devices within the network thereby aggregating the resources of each device. In other words, once the devices are aggregated, resources can be shared, pooled or combined for use together or via the original mobile device.

As described above, the context analysis component 802 can be employed to incorporate contextual awareness into managing the device connection(s). In operation, information can be gathered, including but not limited to, location information, activity information, information that identifies individuals in proximity, data content, etc. By way of example, but not limitation, the context analysis component 802 can establish that a user is in a conference room, at a specific time of day, for a specific purpose/activity. Thus, the device discovery component (e.g., 702 of FIG. 7) can identify devices available and useful to the particular context.

Subsequently, the device selection component 804 can select an appropriate device or group of devices that incorporate appropriate resources. For example, if a user is in a conference room and preparing for a presentation, a projector device can be selected and connected by way of the device connection component 806. Effectively, here, the projection resource can be used to project files or applications from a 'docked' mobile device.

Figure 9:
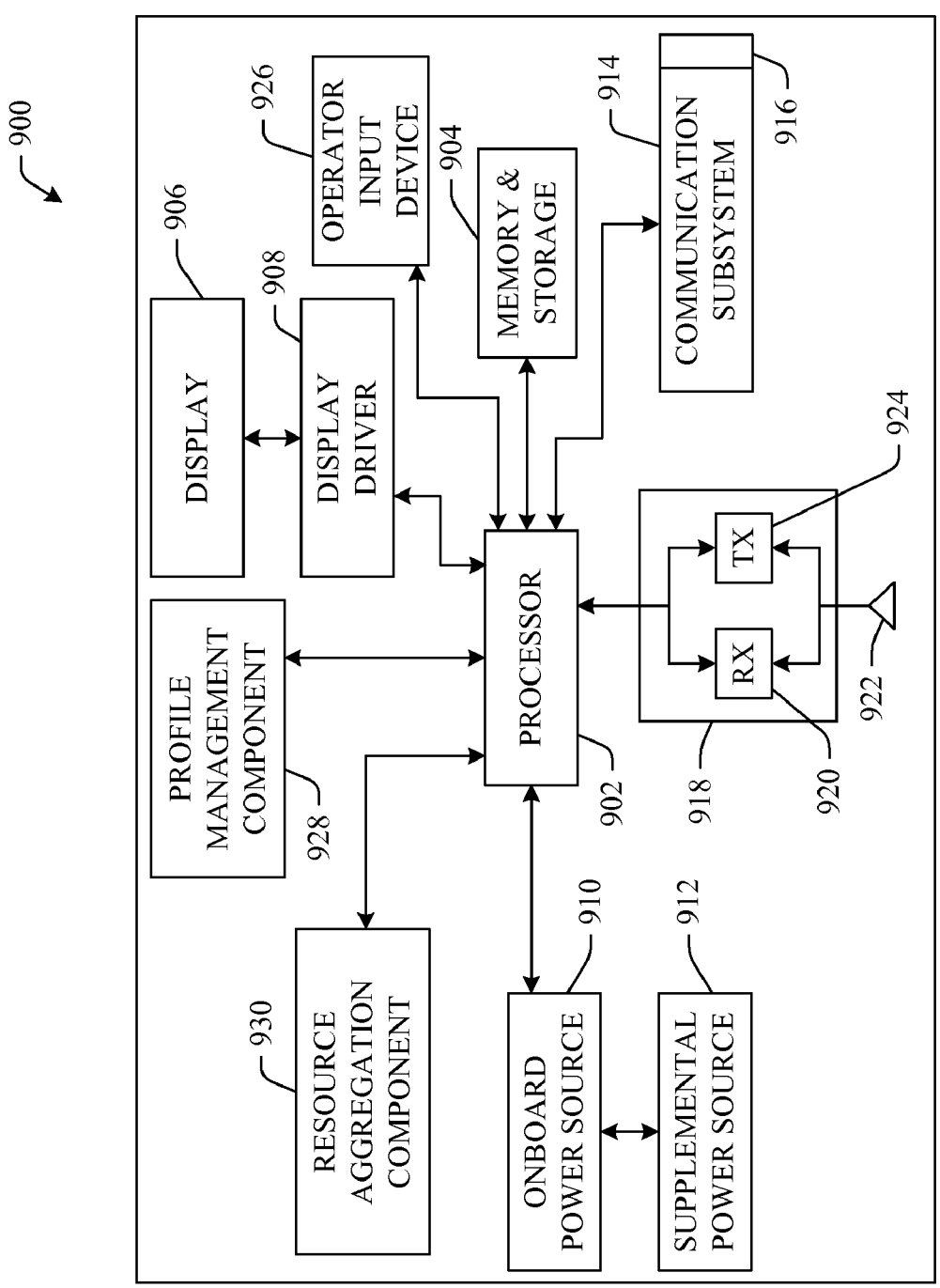
FIG. 9 is a schematic block diagram of a portable device that facilitates device and/or resource aggregation across an opportunistic network according to one aspect of the subject invention.

Referring now to FIG. 9, there is illustrated a schematic block diagram of a portable device 900 according to one aspect of the subject innovation, in which a processor 902 is responsible for controlling the general operation of the device 900. It is to be understood that the portable device 900 can be representative of most any portable device including, but not limited to, a cell phone, smartphone, personal digital assistant (PDA), a personal music player, image capture device (e.g., camera), personal game station, health monitoring device, event recorder component, etc.

The processor 902 can be programmed to control and operate the various components within the device 900 in order to carry out the various functions described herein. The processor 902 can be any of a plurality of suitable processors. The manner in which the processor 902 can be programmed to carry out the functions relating to the subject innovation will be readily apparent to those having ordinary skill in the art based on the description provided herein. As will be described in greater detail infra, a machine learning and reasoning (MLR) component and/or a rules-based logic component can be used to effect an automatic action of processor 902.

A memory and storage component 904 connected to the processor 902 serves to store program code executed by the processor 902, and also serves as a storage means for storing information such as data, services, metadata, device states or the like. In aspects, this memory and storage component 904 can be employed in conjunction with other memory mechanisms that house health-related data. As well, in other aspects, the memory and storage component 904 can be a stand-alone storage device or otherwise synchronized with a cloud or disparate network based storage means, thereby established a local on-board storage of health-related data.

The memory 904 can be a non-volatile memory suitably adapted to store at least a complete set of the information that is acquired. Thus, the memory 904 can include a RAM or flash memory for high-speed access by the processor 902 and/or a mass storage memory, e.g., a micro drive capable of storing gigabytes of data that comprises text, images, audio, and video content. To this end, it is to be appreciated that the health-related data described herein can be of most any form including text (e.g., sensor readings), images (e.g., captured image sequences) as well as audio or video content. According to one aspect, the memory 904 has sufficient storage capacity to store multiple sets of information relating to disparate services, and the processor 902 could include a program for alternating or cycling between various sets of information corresponding to disparate services.

A display 906 can be coupled to the processor 902 via a display driver system 908. The display 906 can be a color liquid crystal display (LCD), plasma display, touch screen display or the like. In one example, the display 906 is a touch screen display. The display 906 functions to present data, graphics, or other information content. Additionally, the display 906 can display a variety of functions that control the execution of the device 900. For example, in a touch screen example, the display 906 can display touch selection buttons which can facilitate a user to interface more easily with the functionalities of the device 900.

Power can be provided to the processor 902 and other components forming the device 900 by an onboard power system 910 (e.g., a battery pack). In the event that the power system 910 fails or becomes disconnected from the device 900, a supplemental power source 912 can be employed to provide power to the processor 902 (and other components (e.g., sensors, image capture device)) and to charge the onboard power system 910. The processor 902 of the device 900 can induce a sleep mode to reduce the current draw upon detection of an anticipated power failure.

The device 900 includes a communication subsystem 914 having a data communication port 916, which is employed to interface the processor 902 with a remote computer, server, service, or the like. The port 916 can include at least one of Universal Serial Bus (USB) and IEEE 1394 serial communications capabilities. Other technologies can also be included, but are not limited to, for example, infrared communication utilizing an infrared data port, Bluetooth™, etc.

The device 900 can also include a radio frequency (RF) transceiver section 918 in operative communication with the processor 902. The RF section 918 includes an RF receiver 920, which receives RF signals from a remote device via an antenna 922 and can demodulate the signal to obtain digital information modulated therein. The RF section 918 also includes an RF transmitter 924 for transmitting information (e.g., data, service) to a remote device, for example, in response to manual user input via a user input 926 (e.g., a keypad) or automatically in response to a detection of entering and/or anticipation of leaving a communication range or other predetermined and programmed criteria.

A profile management component 928 is provided which, as described supra, can facilitate management of user-specific data (e.g., settings, licenses). Accordingly, mobile device 900 can effectively be a thin client that pools or shares resources with other devices within the network as described above. A resource aggregation component 930 can be employed to aggregate the resources between the devices. It is to be appreciated that these components can enable functionality of like-named components (and sub-components) described supra.

Figure 10:
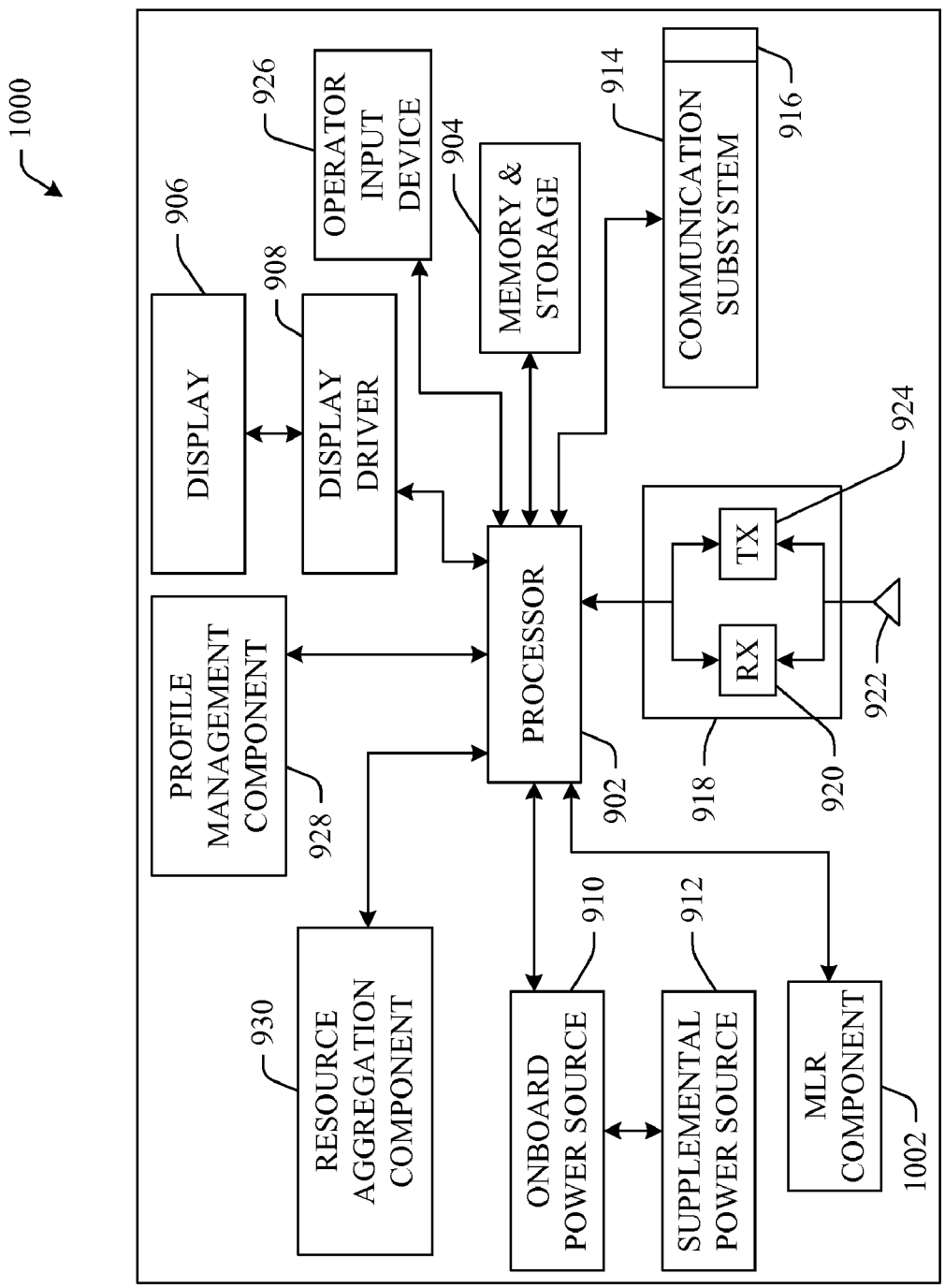
FIG. 10 illustrates an architecture of a portable device that includes a machine learning and reasoning component that can automate functionality in accordance with an aspect of the invention.

FIG. 10 illustrates an example device 1000 that employs MLR component 1002 which facilitates automating one or more features in accordance with the subject innovation. The subject innovation (e.g., in connection with determining available and/or appropriate devices, connection order, connection authorization, preferences) can employ various MLR-based schemes for carrying out various aspects thereof. For example, a process for determining which network devices to employ as a function in a particular context can be facilitated via an automatic classifier system and process. Moreover, where multiple appropriate devices are available, the classifier can be employed to determine which device(s) to select in view of context and other situational factors.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria how to establish a context, which devices to deem appropriate, what connection priority should be employed, which user-specific preferences to employ, etc. It is further to be appreciated that device 1100 can be equipped with an optional rules-based component (not shown) that facilitates policies and/or threshold based logic to be employed in making determinations associated with the functionality described herein.

In other aspects, the example device 1000 can trade off cost and privacy versus emergency needs. For example, if a user is having a heart attack, it may be a logical tradeoff to reveal confidential information and medical data (e.g., ECG) or how much it costs to send in exchange for docking to an appropriate resource to reach help in sufficient time to address the urgency.

In another example, the device 1000 can automatically decide (by inference) to connect to a specific service or resource. By way of example, an ECG can be sent directly to a nearby paramedic or doctor for processing, regardless of which one, or sent to whichever device is being carried by the on-call medical resident for Ward B, as opposed to a particular named doctor or named device. As described above, these decisions can be based upon user preference, inference or rule as a function of data content or context.

Still further, implicit trust relationships can be established between devices based upon context. For example, with regard to privacy and security context, when a device is in a hospital environment, a trust relationship can automatically be established with other devices in near proximity. This automatic trust establishment can facilitate interoperation without restrictive continual authentication demands.

Figure 11:
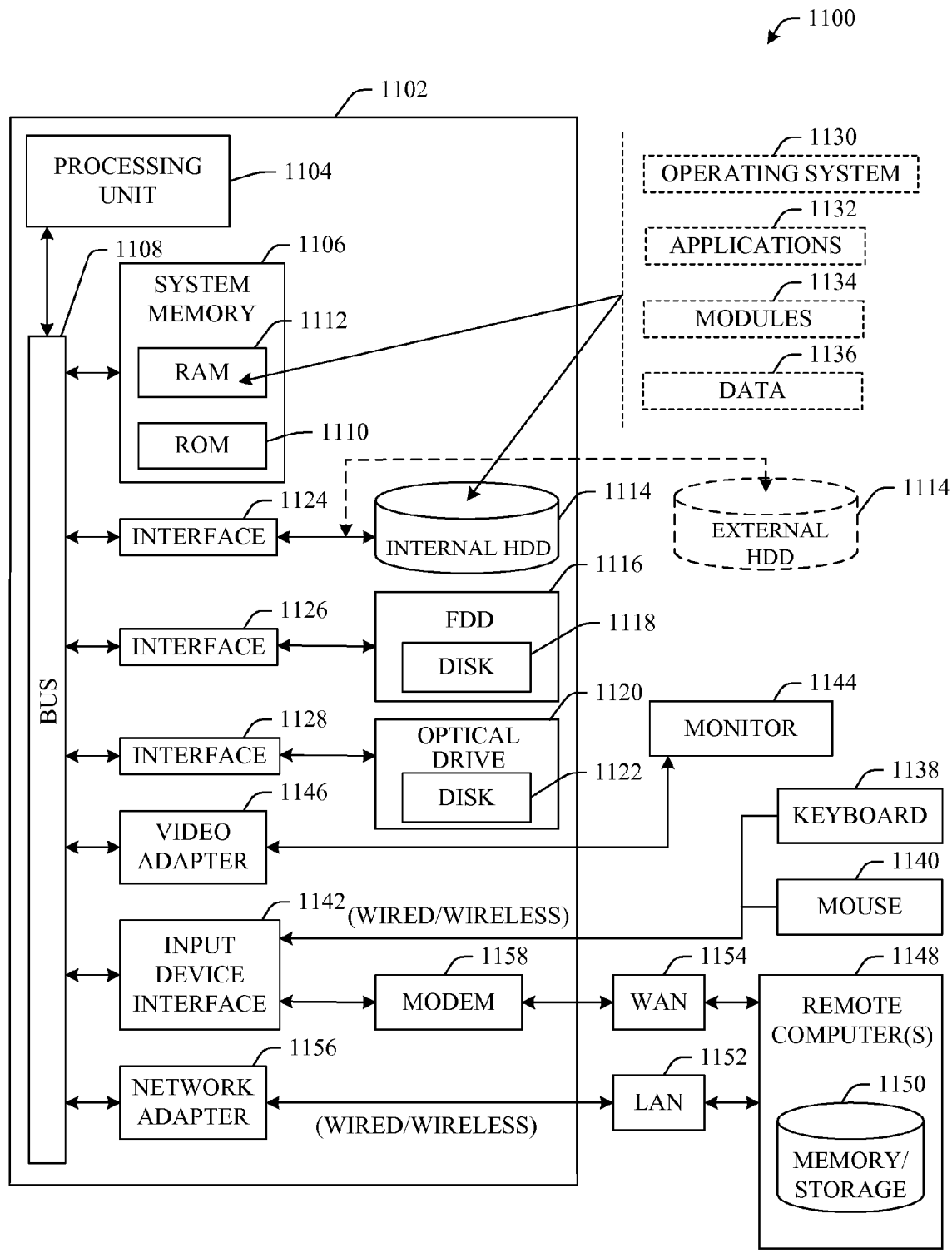
FIG. 11 illustrates a block diagram of a computer operable to execute the disclosed architecture.

Referring now to FIG. 11, there is illustrated a block diagram of a computer operable to execute the disclosed architecture. In order to provide additional context for various aspects of the subject innovation, FIG. 11 and the following discussion are intended to provide a brief, general description of a suitable computing environment 1100 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the innovation includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the innovation can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g. a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
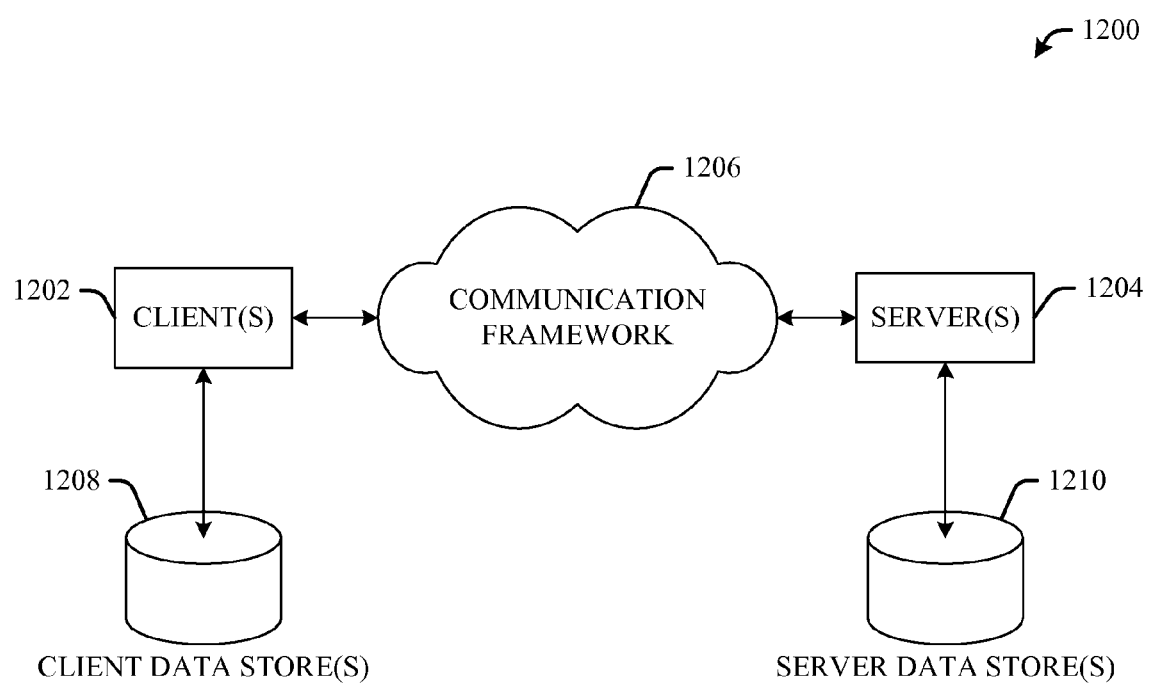
FIG. 12 illustrates a schematic block diagram of an exemplary computing environment in accordance with the subject innovation.

Referring now to FIG. 12, there is illustrated a schematic block diagram of an exemplary computing environment 1200 in accordance with the subject innovation. The system 1200 includes one or more client(s) 1202. The client(s) 1202 can be hardware and/or software (e.g., threads, processes, computing devices). The client(s) 1202 can house cookie(s) and/or associated contextual information by employing the innovation, for example.

The system 1200 also includes one or more server(s) 1204. The server(s) 1204 can also be hardware and/or software (e.g., threads, processes, computing devices). The servers 1204 can house threads to perform transformations by employing the innovation, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a resource aggregation component in a mobile device configured to establish a link from the mobile device to at least one of available support devices comprising a particular available disparate support device, wherein a resource from the particular available disparate support device is configured to be shared within an opportunistic network; and
    a profile management component in the mobile device configured to identify a plurality of parameters configured to manage the resource via the support device wherein one of the plurality of parameters is an activity in a calendar associated with the mobile device, and to define at least one rule to allocate available disparate support devices according to respective disparate datatype processing capabilities of the disparate support devices, wherein the at least one rule comprises concurrently allocating a video stream of a call to the mobile device to the particular available disparate support device configured to process video, wherein identification of the available disparate support devices dynamically changes at least in part as a function of a context associated with the mobile device, the context comprising a geographical location of the mobile device in a room, wherein the room houses the particular disparate support device.

2. The system of claim 1, wherein a determination of the particular available disparate support device with which to establish the link with the mobile device is determined based upon at least one of an acuteness or a severity of a health-related situation.

3. The system of claim 1, further comprising:
    a network analysis component in the mobile device configured to identify the available support devices within the opportunistic network; and
    a connection management component configured to select a subset of the available support devices based upon resources available in the subset of the available support devices, wherein the particular available disparate support device is one of the subset of the available support devices.

4. The system of claim 3, wherein the connection management component is further configured to determine the subset of the available support devices as a function of policy criteria.

5. The system of claim 3, further comprising:
    a device discovery component in the mobile device configured to locate the available support devices within the opportunistic network; and
    a device analysis component configured to analyze the available support devices, wherein the resource aggregation component is further configured to employ analysis of the available support devices to select the particular available disparate support device.

6. The system of claim 3, further comprising a context analysis component configured to identify the context associated with the mobile device, wherein selection of the particular available disparate support device is based upon the context.

7. The system of claim 3, further comprising a device selection component in the mobile device configured to analyze the context and use the context to select the particular available disparate support device.

8. The system of claim 3, further comprising a device connection component configured to route data to and from the resources.

9. The system of claim 1, further comprising a device criteria component configured to maintain information related to a available support devices within the opportunistic network, wherein selection of the support device from the available support devices is based upon a subset of the information related to the plurality of available support devices.

10. The system of claim 1, further comprising an application criteria component configured to maintain information related to a plurality of applications, wherein the information related to the plurality of applications is configured to be employed to render data by way of the particular available support device.

11. The system of claim 1, further comprising a machine learning and reasoning component configured to automatically select the particular available support device based upon at least one of a probabilistic analysis or a statistical-based analysis.

12. A computer-readable storage medium that is not a signal, the computer-readable storage medium storing instructions that, when executed by a computing device comprising a mobile device, cause the computing device to perform operations comprising:

establishing an opportunistic networking infrastructure by at least one of occasional or periodic interconnection of a plurality of static devices;

analyzing the mobile device within the opportunistic networking infrastructure;

inferring a subset of the plurality of the static devices at least as a function of a context of the mobile device, wherein the subset of the plurality of the static devices are capable of rendering image data;

accessing at least one resource in the subset of the plurality of the static devices;

aggregating at least one functionality of the at least one of the resource and at least one functionality of the mobile device, the at least one functionality of the at least one of the resource disparate from the at least one functionality of the mobile device;

establishing a connection of the mobile device with the opportunistic network infrastructure;

employing a sensory mechanism to sense at least one of location or motion of the mobile device to establish the context; and based, at least, on the context and at least one rule defining an allocation of resources according to data processing capabilities, selecting two or more static devices from the subset of the plurality of devices to link to the mobile device.

13. The system of claim 1, wherein the at least one rule further comprises allocating an audio stream of the call to a second disparate support device configured to process audio.

14. The system of claim 1, wherein at least one of the parameters is an expense acceptable by the mobile device for the resource, and wherein the identification of the support device further dynamically changes at least as a function of an expense of the resource provided via the support device.

15. The system of claim 1, wherein at least one of the parameters is an activity in a calendar associated with the mobile device and an identified support device is a support device associated with participation in the activity.

16. A computer-implemented method, comprising:

establishing an opportunistic networking infrastructure by at least one of occasional or periodic interconnection of a plurality of static devices;

analyzing a mobile device within the opportunistic networking infrastructure;

inferring a subset of the plurality of the static devices at least as a function of a context of the mobile device, wherein the subset of the plurality of the static devices are capable of rending image data;

accessing at least one resource in the subset of the plurality of the static devices;

aggregating at least one functionality of the at least one of the resource and at least one functionality of the mobile device, the at least one functionality of the at least one of the resource disparate from the at least one functionality of the mobile device; and establishing a connection of the mobile device with the opportunistic network infrastructure;

employing a sensory mechanism to sense at least one of location or motion of the mobile device to establish the context; and based, at least, on the context and at least one rule defining an allocation of resources according to data processing capabilities, selecting two or more static devices from the subset of the plurality of devices to link to the mobile device.

17. The computer-implemented method of claim 16, wherein employing a sensory mechanism to sense at least one of location or motion of the mobile device to establish the context comprises determining the location of the mobile device and whether the mobile device is in motion to a target location.

18. The computer-implemented method of claim 16, wherein selecting two or more static devices from the subset of the plurality of devices to link to the mobile device is further based on at least one of operating expense, availability, priority, and access rights.

19. The computer-implemented method of claim 16, wherein establishing an opportunistic networking infrastructure by at least one of occasional or periodic interconnection of a plurality of static devices comprises dynamically monitoring activity and availability of static devices proximate to the mobile device.

* * * * *